United States Patent Office 3,207,796
Patented Sept. 21, 1965

3,207,796
PREPARATION OF NITROALKYL CHLORIDES
Theodore M. Benziger and Robert K. Rohwer, Los Alamos, N. Mex., assignors to the United States of America as represented by the United States Atomic Energy Commission
No Drawing. Filed May 22, 1964, Ser. No. 369,639
6 Claims. (Cl. 260—644)

This invention relates to a process for the preparation of lower nitroalkyl chlorides and in particular to a process in which a beta-nitroalcohol is reacted with sulfuryl chloride in the presence of a tertiary organic base.

While the prior art discloses the halogenation of saturated and unsaturated paraffin hydrocarbons using sulfuryl chloride as the chlorinating agent, the process of this invention is directed to replacing an OH group from the nitroalcohol to form a chloride.

Examples of the nitroalkyl chlorides which are prepared from their corresponding nitroalcohols using the process of this invention are 2,2-dinitropropyl chloride from 2,2-dinitropropanol, 1,3-dichloro-2-methyl-2-nitropropane from 2-methyl-2-nitropropanediol, and 2,2-dinitro-1,3-dichloropropane from 2,2-dinitro-1,3-propanediol.

The uses of nitroalkyl chlorides are many but offer greatest utility as plasticizers, solvents, chemical intermediates, and as a component of high explosive compositions.

It is therefore an object of this invention to provide a process for the preparation of lower nitroalkyl chlorides by reacting a beta-nitroalcohol with sulfuryl chloride in the presence of pyridine.

Other objects and advantages of this invention will be apparent from the descriptions of the preferred embodiment which follow.

The 2,2-dinitropropyl chloride is prepared in the following manner. A solution composed of 3.0 grams (0.02 mole) of 2,2-dinitropropanol and 1.7 grams (0.02 mole) of pyridine in 10 cc. of ethylene chloride is held at its boiling point for ten minutes using a reflux condenser. The solution is then cooled using an ice bath, and to this cold, stirred solution is slowly added, drop-wise, 2.7 grams (0.02 mole) of sulfuryl chloride, $SO_2Cl_2$, dissolved in 5 cc. of ethylene chloride. This mixture is brought to reflux temperature and held therefor four hours. The said mixture is then washed two times with an equal volume of water and dried over sodium sulfate before evaporating the solvent. The recovery of 2,2-dinitropropyl chloride by means of distillation is 83% of theory. The product has a boiling point of 73° C. (8 mm.) and refractive index of 1.4568 $n^{25}{}_D$.

Calculated for $C_3H_5ClN_2O_4$: Percent C, 21.38; percent H, 2.99; percent N, 16.62; percent Cl, 21.04. Found: percent C, 21.10; percent H, 3.49; percent N, 16.41; percent Cl, 20.79.

The 2,2-dinitro-1,3-dichloropropane is prepared in the following manner. A solution composed of 1.66 grams (0.01 mole) of 2,2-dinitro-1,3-propanediol and 1.97 grams of pyridine (0.025 mole) in 5 cc. of methylene chloride is held at its boiling point for ten minutes using a reflux condenser. The solution is then cooled using an ice bath, and to this cold, stirred solution is slowly added, drop-wise, 3.38 grams (0.025 mole) of sulfuryl chloride, $SO_2Cl_2$, dissolved in 2 cc. of methylene chloride. This mixture is brought to reflux temperature and held there for three hours. The said mixture is then washed two times with an equal volume of water and dried over sodium sulfate before evaporating the solvent. The recovery of 2,2-dinitro-1,3-dichloropropane by means of distillation is 57% of theory. The product has a boiling point of 48° C. (2 mm.).

Calculated for $C_3H_4Cl_2N_2O_4$: Percent C, 17.75; percent H, 1.99; percent N, 13.80; percent Cl, 34.93. Found: percent C, 17.78; percent H, 2.25; percent N, 13.59; percent Cl, 33.47.

Although the foregoing descriptions are limited to 2,2-dinitropropanol and 2,2-dinitro-1,3-propanediol, any beta-nitroalcohol may be used. In like manner, any tertiary organic base may be substituted for the pyridine and any inert solvent may be employed.

It will be understood that this invention is not to be limited to the details given herein but that it may be modified within the scope of the appended claims.

What we claim is:

1. A method of preparing lower nitroalkyl chlorides consisting of reacting sulfuryl chloride with a lower beta-nitroalkyl alcohol in the presence of a tertiary organic base.
2. The method of claim 1 in which the said tertiary organic base is pyridine.
3. The method of claim 1 in which said alcohol is 2,2-dinitropropanol.
4. The method of claim 1 in which said alcohol is 2,2-dinitro-1,3-propanediol.
5. The method of claim 1 in which said lower nitroalkyl alcohol is a beta-nitroalcohol.
6. As a new composition of matter, 2,2-dinitro-1,3-dichloropropane having the structural formula:

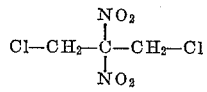

References Cited by the Examiner

Nobel et. al.: Chem. Reviews, vol. 64, pages 19–57 (only page 42 relied on) QD 1A563.

CARL D. QUARFORTH, *Primary Examiner*.
REUBEN EPSTEIN, *Examiner*.